United States Patent
Horii (10) Patent No.: US 11,315,235 B2
(45) Date of Patent: Apr. 26, 2022

(54) PROCESSING METHOD FOR PERFORMING PROCESS ON IMAGE AND PROCESSING DEVICE USING THE PROCESSING METHOD

(71) Applicant: Panasonic Intellectual Property Management Co., Ltd., Osaka (JP)

(72) Inventor: Toshihide Horii, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/969,838

(22) PCT Filed: Sep. 28, 2018

(86) PCT No.: PCT/JP2018/036248
§ 371 (c)(1),
(2) Date: Aug. 13, 2020

(87) PCT Pub. No.: WO2019/159419
PCT Pub. Date: Aug. 22, 2019

(65) Prior Publication Data
US 2020/0380665 A1    Dec. 3, 2020

(30) Foreign Application Priority Data

Feb. 16, 2018    (WO) .................. PCT/JP2018/005494

(51) Int. Cl.
*G06F 17/15*    (2006.01)
*G06N 3/04*    (2006.01)
(Continued)

(52) U.S. Cl.
CPC ............ *G06T 7/0004* (2013.01); *G06F 17/15* (2013.01); *G06N 3/04* (2013.01); *G06N 3/08* (2013.01);
(Continued)

(58) Field of Classification Search
CPC combination set(s) only.
See application file for complete search history.

(56) References Cited

U.S. PATENT DOCUMENTS

2017/0148222 A1* 5/2017 Holzer ................. H04N 13/279
2018/0075594 A1* 3/2018 Brauer ................. G06K 9/6267
(Continued)

OTHER PUBLICATIONS

Luis Tob'ias , "Convolutional Neural Networks for Object Recognition on Mobile Devices: a Case Study", Dec. 4-8, 2016, 2016 23rd International Conference on Pattern Recognition (ICPR) Cancún Center, Cancún, México, pp. 3530-3534.*
(Continued)

*Primary Examiner* — Omar S Ismail
(74) *Attorney, Agent, or Firm* — McDermott Will & Emery LLP (57) ABSTRACT

An input unit 132 receives an input of an image subject to a process. A processing unit subjects the image input to the input unit 132 to a process of a convolutional neural network in which a fully connected layer is excluded. The convolutional neural network in the processing unit 114 includes a convolutional layer and a pooling layer. An output unit outputs a result of the process in the processing unit 114. A filter of the convolutional layer in the convolutional neural network in the processing unit 114 is trained to learn the result of the process having a 1×1 spatial dimension.

6 Claims, 9 Drawing Sheets

(51) Int. Cl.
  *G06N 3/08* (2006.01)
  *G06T 7/00* (2017.01)
(52) U.S. Cl.
  CPC .............. *G06T 2207/20081* (2013.01); *G06T 2207/20084* (2013.01)

(56) References Cited

U.S. PATENT DOCUMENTS

2018/0157933 A1* 6/2018 Brauer ................... G06T 7/001
2018/0218254 A1* 8/2018 Feng ....................... G06N 20/00

OTHER PUBLICATIONS

Rui Hou,"Tube Convolutional Neural Network (T-CNN) for Action Detection in Videos," Oct. 2017,Proceedings of the IEEE International Conference on Computer Vision (ICCV),2017, pp. 5822-5828.*

Liang-Chieh Chen,"Rethinking Atrous Convolution for Semantic Image Segmentation," May 12, 2017, Computer Vision and Pattern Recognition,arXiv:1706.05587.pp. 1-9.*

Zhaofan Qiu,"Learning Spatio-Temporal Representation with Pseudo-3D Residual Networks," Oct. 2017, Proceedings of the IEEE International Conference on Computer Vision (ICCV), 2017, pp. 5533-5540.*

Xiang Zhang,"OverFeat:Integrated Recognition, Localization and Detection using Convolutional Networks," Feb. 24, 2014,Computer Vision and Pattern Recognition, arXiv:1312.6229 ,pp. 1-12.*

Hyungtae Lee,"Contextual Deep CNN Based Hyperspectral Classification," Mar. 11, 2016,2016 IEEE International Geoscience and Remote Sensing Symposium (IGARSS),pp. 3322-3324.*

Francois Chollet,"Xception: Deep Learning with Depthwise Separable Convolutions," Jul. 2017, Proceedings of the IEEE Conference on Computer Vision and Pattern Recognition (CVPR), 2017, pp. 1251-1256.*

Extended European Search Report issued in corresponding European Patent Application No. 18905937.1, dated Mar. 26, 2021.

Jonathan Long, Evan Shelhamer, Trevor Darrell, "Fully Convolutional Networks for Semantic Segmentation", The IEEE Conference on Computer Vision and Pattern Recognition (CVPR), 2015, pp. 3431-3440.

International Search Report issued in corresponding International Patent Application No. PCT/JP2018/036248, dated Dec. 18, 2018, with English translation.

* cited by examiner

PROCESSING METHOD FOR PERFORMING PROCESS ON IMAGE AND PROCESSING DEVICE USING THE PROCESSING METHOD

CROSS REFERENCE

This application is the U.S. National Phase under 35 U.S.C. § 371 of International Application No. PCT/JP2018/036248, filed on Sep. 28, 2018, which claims the benefit of International Application No. PCT/JP2018/005494, filed on Feb. 16, 2018, the entire contents are hereby incorporated by reference.

BACKGROUND ART

For image recognition processes, DeepLearning is used, for example. DeepLearning is known as a methodology of machine learning using a multilayer neural network. For example, a convolutional neural network is used for a multilayer neural network. A convolutional neural network is formed by a multilayer neural network in which convolution and pooling in local regions are repeated. A structure of a fully convolutional neural network in which all connected layers forming a convolutional neural network are configured as convolutional layers is also proposed (see, for example, non-patent literature 1).

NON PATENT LITERATURE 1

Jonathan Long, Evan Shelhamer, Trevor Darrell, "Fully Convolutional Networks for Semantic Segmentation", The IEEE Conference on Computer Vision and Pattern Recognition (CVPR), 2015, pp. 3431-3440

SUMMARY OF INVENTION

Technical Problem

In order to use a fully convolutional neural network in an image recognition process, it is necessary to train the fully convolutional neutral network by using training data. In the case of a fully convolutional neural network, an image segmented by colors is used as training data. Generally, an image segmented by colors is produced by a manual operation. The larger the number of items of training data, the larger the workload required for the manual operation. Meanwhile, the larger the number of items of training data used for training, the higher the precision of the image recognition process.

The present invention addresses the above-described issue and an illustrative purpose thereof is to provide a technology of inhibiting a reduction in the precision of an image recognition process while at the same time inhibiting an increase in the workload required for learning.

Solution to Problem

A processing device according to an embodiment of the present disclosure includes: an input unit that receives an input of an image subject to a process; a processing unit that subjects the image input to the input unit to a process of a convolutional neural network in which a fully connected layer is excluded; and an output unit that outputs a result of the process in the processing unit. The convolutional neural network in the processing unit includes a convolutional layer and a pooling layer. A filter of the convolutional layer in the convolutional neural network in the processing unit is trained to learn the result of the process having a 1×1 spatial dimension, and a size of the image input to the input unit is larger than a size of an image for learning input to the convolutional neural network when the filter of the convolutional layer is trained for learning, the image for learning corresponding to the result of the process used to train the filter of the convolutional layer for learning.

Another embodiment of the present disclosure relates to a processing method. The method includes: receiving an input of an image subject to a process; subjecting the input image to a process of a convolutional neural network in which a fully connected layer is excluded; and outputting a result of the process. The convolutional neural network includes a convolutional layer and a pooling layer. A filter of the convolutional layer in the convolutional neural network is trained to learn the result of the process having a 1×1 spatial dimension, and a size of the input image is larger than a size of an image for learning input to the convolutional neural network when the filter of the convolutional layer is trained for learning, the image for learning corresponding to the result of the process used to train the filter of the convolutional layer for learning.

Optional combinations of the aforementioned constituting elements, and implementations of the present disclosure in the form of methods, devices, systems, computer programs, recording mediums recording computer programs, etc. may also be practiced as additional modes of the present disclosure.

Advantageous Effects of Invention

According to the present disclosure, it is possible to inhibit a reduction in the precision of an image recognition process while at the same time inhibiting an increase in the workload required for learning.

DESCRIPTION OF EMBODIMENTS

A summary will be given before describing the embodiment of the present disclosure in specific details. The embodiment relates to a processing device for performing an inspection of a solar cell by performing an image recognition process on an image that captures the solar cell. An example of inspection of a solar cell is a determination on whether or not an internal crack is found in the solar cell. A solar cell in which an internal crack is produced is easily broken in response to an impact and so is defined as a defective product. In the case that the solar cell is made of a monocrystal silicon, an internal crack is produced at an angle of 45°. Even though it is known that an internal crack occurs at a predefined angle, it is difficult to detect an internal crack if the internal crack overlaps an etching unevenness. For this reason, an image recognition process is used for inspection of a solar cell.

In the related art, an image capturing a solar cell is subjected to Gabor filtering to highlight the line at 45° before performing DeepLearning. If an electrode at an angle of 45° is formed on the surface of the solar cell, however, such an electrode is also highlighted by Gabor filtering, which makes it difficult to use Gabor filtering. In this situation, it is effective to use a convolutional neural network for an image that captures a solar cell. A convolutional neural network includes a convolutional layer that extracts a feature through a convolutional process using a plurality of filters, a pooling layer that obtains invariance in local data through a pooling process that aggregates responses in a certain region, and a fully connected layer that performs recognition by using a probability calculated by a Softmax function, etc. Of these, the fully bonded layer of a convolutional neural network makes it difficult to process an image or an arbitrary size. To resolve this, a fully convolutional neural network in which the fully connected layer of the convolutional neural network is replaced by a convolutional layer is used.

In a fully convolutional neural network, a downsampling process in which processes in a convolutional layer and a pooling layer are repeated is performed, and then an upsampling process in which processes in a convolutional layer and an up-pooling layer are repeated is performed. It should be noted here that the downsampling process reduces the spatial dimension of the image and the upsampling process enlarges the spatial dimension of the image. The image output from the fully convolutional neural network (hereinafter, referred to as "output image") through these processes has a dimension equivalent to that of the image that is input (hereinafter, referred to as "input image"). Further, the output image is subjected to segmentation by filling objects in the image with colors. A neural network including a fully convolutional neural network need be trained for learning before performing an image recognition process. In the case of a fully convolutional neural network, training data is sued to learn a filter coefficient in the convolutional layer. As mentioned above, however, the workload required to produce training data is large. It is necessary to increase the number of items of training data to improve the precision of the image recognition process. If the number of items of training data is increased, the workload required to produce training data is further increased.

In order to inhibit an increase in the workload to produce training data, this embodiment uses a convolutional neural network in which an upsampling process in a fully convolutional neural network is excluded. It should be noted here that training data that yields an output image having a 1×1 spatial dimension and an input image corresponding to that training data are used for learning. In this embodiment, the input image corresponding to the training data may be referred to as "image for learning". The training data only indicates a result of segmentation (e.g., OK), an internal crack, a color unevenness, etc., and positional information is deleted. This facilitates producing training data. Therefore, even if the number of items of training data is increased, the workload required to produce training data is inhibited from increasing. Meanwhile, it is only necessary, in an image recognition process, to identify a position where an internal crack is produced in a solar cell that should be identified as being defective. The position can be identified if a processing result is obtained in the form of a like image of the solar cell. Therefore, the precision of the image recognition process is inhibited from being reduced by practicing this embodiment.

Figure 1A:
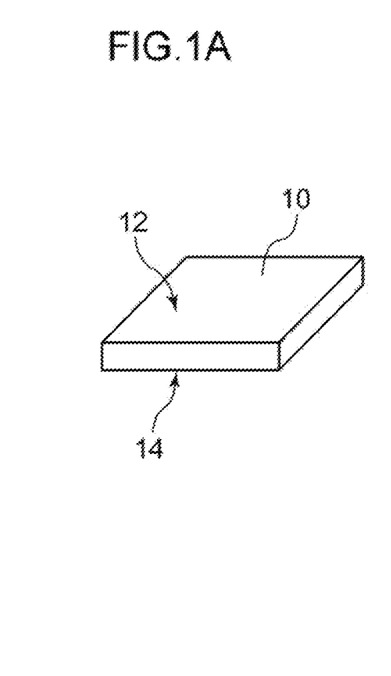
FIGS. 1A-1C show a subject of processing in the embodiment.
Figure 1B:
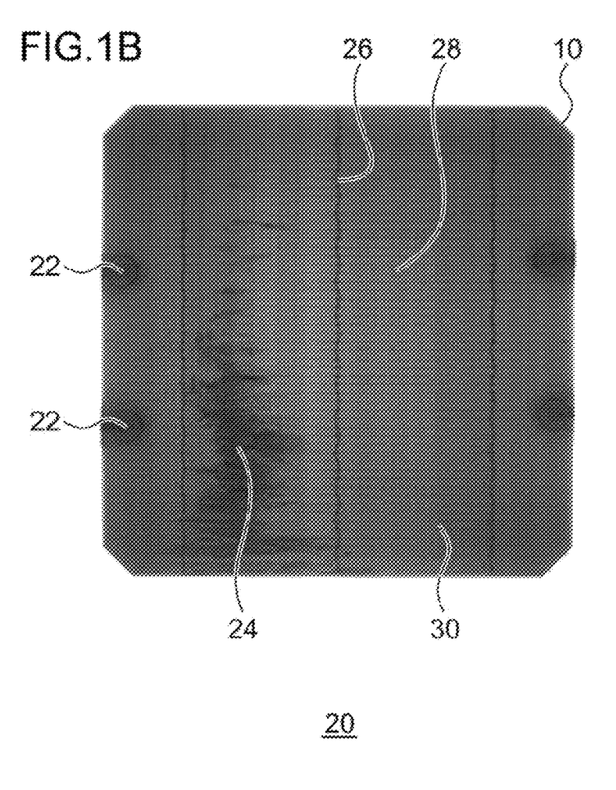
Figure 1C:
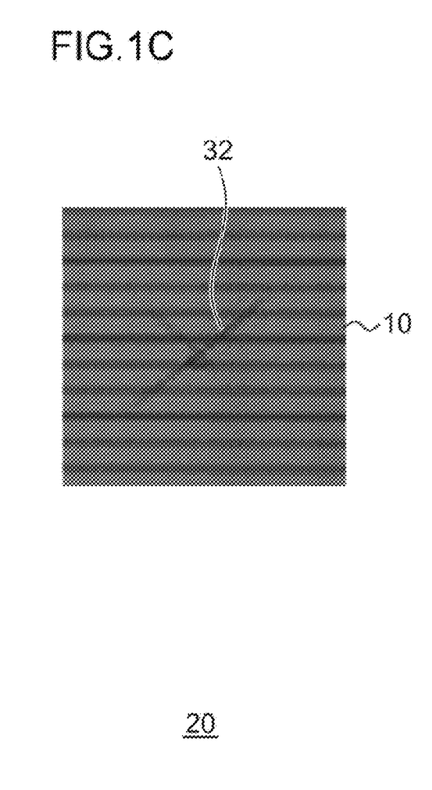

FIGS. 1A-1C show a subject of processing in the embodiment. FIG. 1A is a perspective view showing a configuration of a solar cell 10 subject to inspection, i.e., subject to an image recognition process. The solar cell 10 is made of, for example, a monocrystal silicon and has a plate shape including a light receiving surface 12 and a back surface 14. The light receiving surface 12 is a surface that sunlight is mainly incident to, and the back surface 14 is a surface facing away the light receiving surface 12. FIG. 1B shows an infrared image 20 of the solar cell 10 of FIG. 1A captured from the side of the light receiving surface 12 or the back surface 14. The image 20 shows adsorption pads 22, an etching unevenness 24, an electrode reinforcing wire 26, a saw mark 28, and a wafer thickness distribution 30 appearing as patterns on the solar cell 10. These features are publicly known so that a description thereof is omitted. The figure shows a pattern of a non-defective product instead of a defective product.

FIG. 1C shows an infrared image 20 of the solar cell 10 of FIG. 1A captured from the side of the light receiving surface 12 or the back surface 14. FIG. 1C represents the image 20 of the solar cell 10 different from the image of FIG. 1B. As shown in the figure, an internal crack 32 marked by "x" that is an intersection between a line extending in a direction at an angle of 45° and a line extending in a direction at an angle of 135° is shown on the solar cell 10. The figure shows a pattern of a defective product. The figure only shows the internal crack 32 for clarity of explanation. In reality, however, the internal crack 32 is potentially found in the image 20 as shown in FIG. 1B. For example, the internal crack lays hidden in the adsorption pad 22 or in the etching unevenness 24. It is therefore not easy to accurately determine whether the internal crack 32 is included in the image 20.

Figure 2:
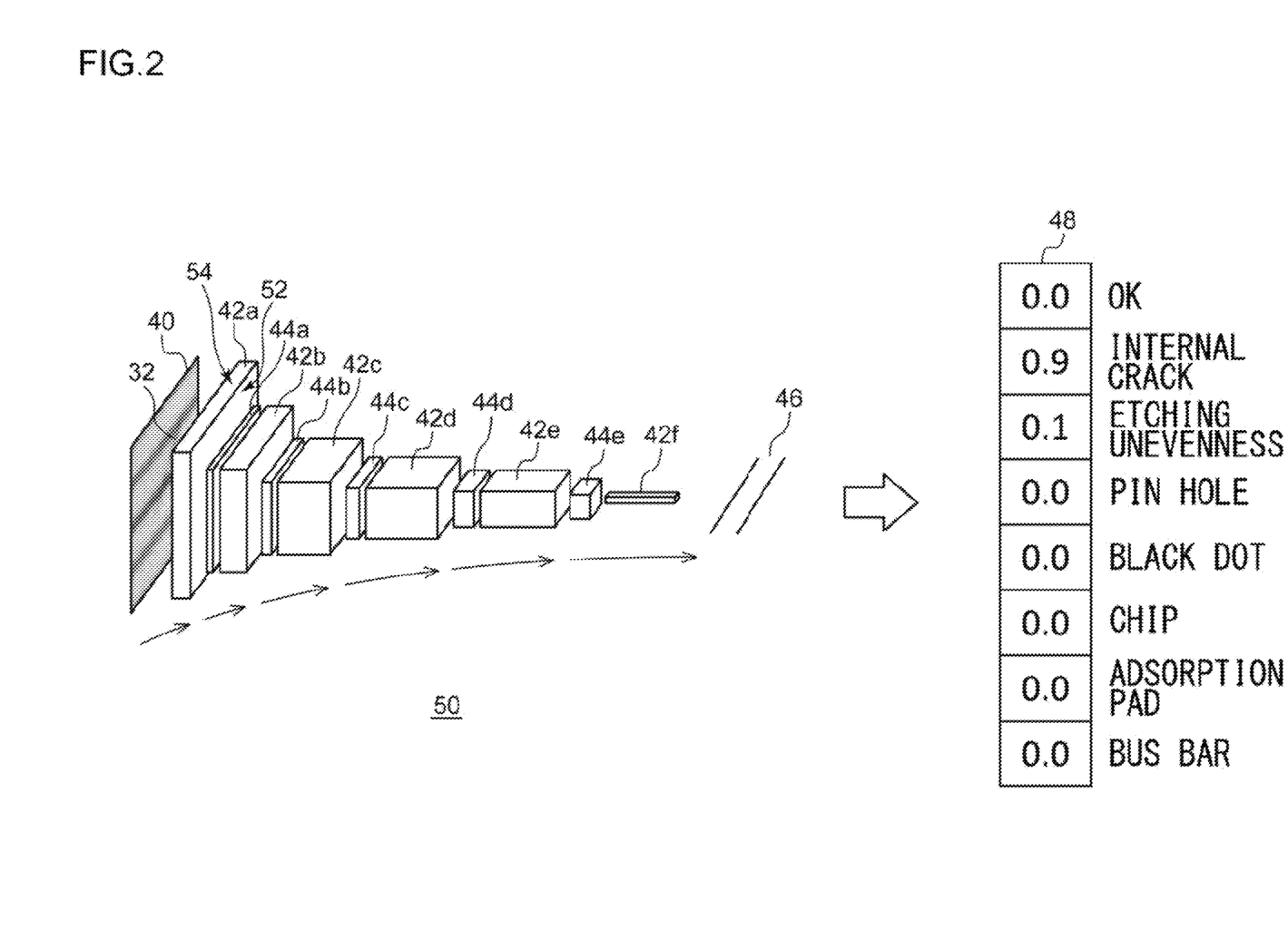
FIG. 2 shows an outline of a process in a processing device according to a comparative example of the embodiment.

FIG. 2 shows an outline of a process in a processing device 50 according to a comparative example of the embodiment. The processing device 50 has a configuration of a convolutional neural network that includes the fully connected layer described above. The processing device 50 includes a first convolutional layer 42a, a second convolutional layer 42b, a third convolutional layer 42c, a fourth convolutional layer 42d, a fifth convolutional layer 42e, a sixth convolutional layer 42f, which are generically referred to as convolutional layers 42, a first pooling layer 44a, a second pooling layer 44b, a third pooling layer 44c, a fourth pooling layer 44d, a fifth pooling layer 44e, which are generically referred to as pooling layers 44, and a fully connected layer 46. The convolutional layers 42, the pooling layers 44, and the fully connected layer are shown as blocks to give an image of the respective processes. An input image 40 is an image subject to an image recognition process in the processing device 50 and represents at least a portion of the image 20 described above. The input image 40 is input to the first convolutional layer 42a.

Each convolutional layer 42 is shown as a hexahedron comprised of two first faces 52 each having a square shape and each having a depth direction and a height direction, and four second faces 54 sandwiched by the two first faces 52. For clarity of illustration, only the first face 52 and the second face 54 of the first convolutional layer 42a are denoted by reference symbols. The magnitude of the first face 52 indicates the size of the spatial dimension of the image processed by the convolutional layer 42, i.e., the size of the image. The convolutional layer 42 subjects the image to spatial filtering, successively shifting a spatial filter of a size smaller than the size of the image.

Spatial filtering is a publicly known technology, and a description thereof is omitted. Spatial filtering is equivalent to a convolutional process. The convolution process extracts a feature amount of the image. Padding, etc. may be performed in the convolutional layer 42. The convolutional layer 42 may also use a plurality of spatial filters in parallel and perform a plurality of spatial filtering steps in parallel in the image. Using a plurality of spatial filters in parallel increases the image. The number of spatial filters used in parallel in the convolutional layer 42 is referred to as the number of channels, which is indicated by the length of the second face 54 in the horizontal direction.

Each pooling layer 44 is configured in a manner similar to that of the convolutional layer 42. The pooling layer 44 reduces the size of the image by aggregating a plurality of pixels included in an arbitrary region in the image into a single pixel. For aggregation of a plurality of pixels into a single pixel, average pooling or maximum pooling is performed. In average pooling, an average value of a plurality of pixel values in the region is used for the single pixel. In maximum pooling, the maximum value of a plurality of pixel values in the region is used for the single pixel. A pooling process is performed to reinforce the robustness for translation of a representative value or an average value in the region of interest.

In the illustrated example, the processes are performed in the order of the first convolutional layer 42a, the first pooling layer 44a, the second convolutional layer 42b, the second pooling layer 44b, the third convolutional layer 42c, the third pooling layer 44c, the fourth convolutional layer 42d, the fourth pooling layer 44d, the fifth convolutional layer 42e, the fifth pooling layer 44e, and the sixth convolutional layer 42f. In other words, a convolutional process and a pooling process are repeatedly performed. By repeating a convolutional process and a pooling process, the size of the image is progressively reduced. The sixth convolutional layer 42f outputs an image having a 1×1 spatial dimension and having one or more channels to the fully connected layer 46. In this case, the number of channels is "8", by way of one example.

The fully connected layer 46 receives an image from which a feature amount is extracted from the sixth convolutional layer 42f. The fully connected layer 46 identifies the image by performing organization into a plurality of classes based on the feature amount. A publicly known technology may be used in the process in the fully connected layer 46, and a description thereof is omitted. The result of organization in the fully connected layer 46, i.e., the result of identification, is an output 48. The output 48 shows a probability for each of 8 classes including "OK", "internal crack", "etching unevenness", "pin hole", "black dot", "chip", "adsorption pad", and "bus bar". In this case, the probability "0.9" for "internal crack" is high so that the input image 40 is identified to include the internal crack 32.

A learning (training) process is performed for the processing device 50 before performing an image recognition process as described above. In a learning process, training data that yields the known output 48 and an image for learning corresponding to the training data are input to the processing device 50 to learn a coefficient in the fully connected layer and a coefficient of the spatial filter of each convolutional layer 42. The image for learning has the same size as the input image 40 and is an original image that outputs the training data when the image recognition process is performed accurately. For a learning process like this, a publicly known technology may be used. In a learning process, the larger the amount of combinations of training data and images for learning used, the higher the precision of the coefficients and the more improved the precision of the image recognition process.

When the learning process is terminated, the aforementioned image recognition process is performed. The input image 40 produced by cropping the original image 20 into a predetermined size is input to the processing device 50. The processing device 50 performs an image recognition process in a two-dimensional manner to determine whether the internal crack 32 or the like is found in the input image 40. If the internal crack 32 is found in the input image 40, the processing device produces the output 48 indicating the presence of the internal crack 32. This is equivalent to organization into 8 classes in the image recognition process.

The convolutional neural network used in the processing device 50 includes the fully connected layer 46. Since the size of the output 48 from the fully connected layer is fixed, the size of the input image 40 that can be processed by the convolutional neural network is also fixed. In other words, the processing device 50 can only perform a recognition process on the input image 40 of a limited size. For this reason, a limitation to the size of the input image 40 is provided in the processing device 50.

Figure 3:
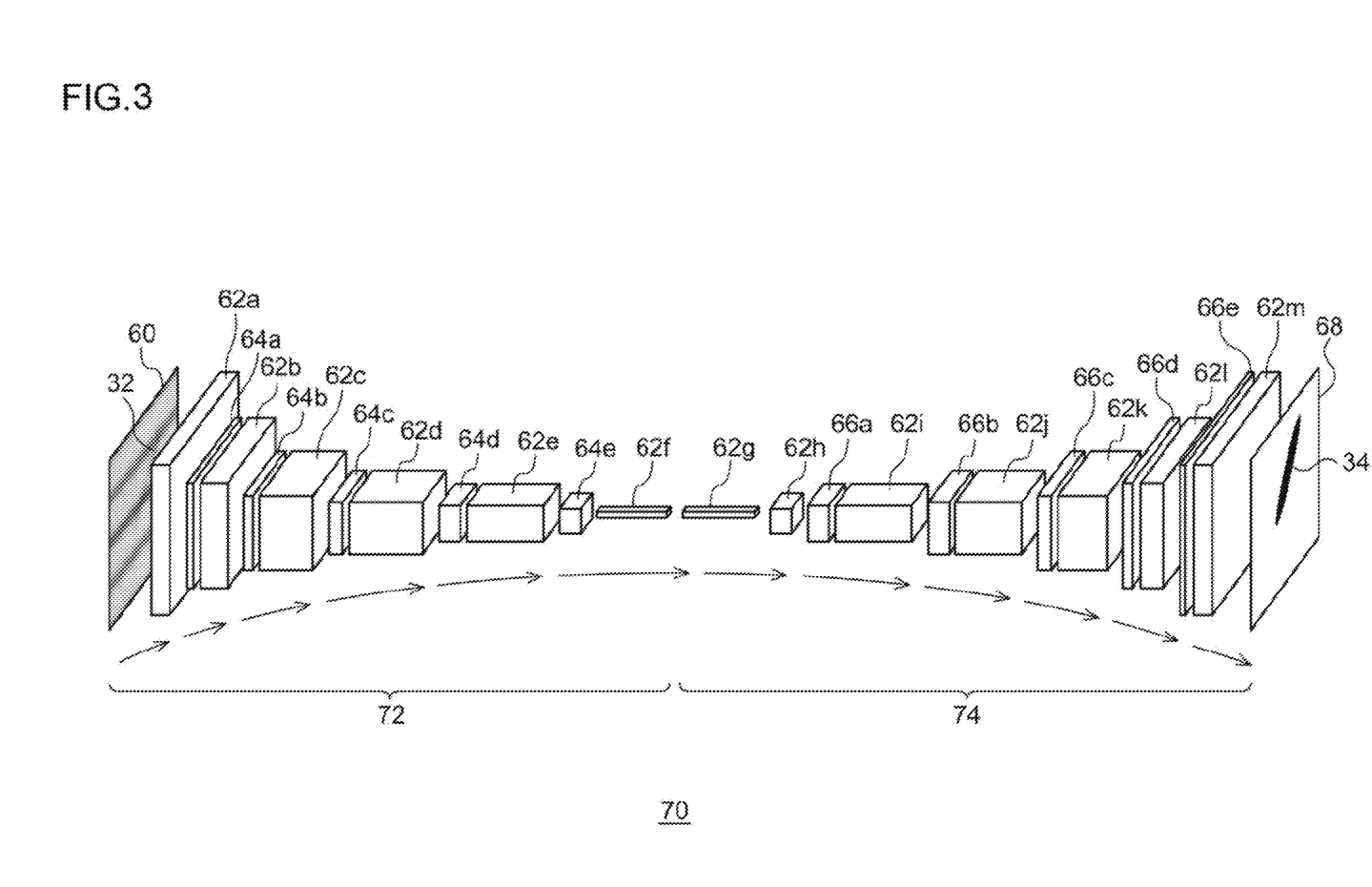
FIG. 3 shows an outline of a process in a processing device according to a comparative example of the embodiment.

FIG. 3 shows an outline of a process in a processing device 70 according to a comparative example of the embodiment. The processing device 70 has a configuration of a fully convolutional neural network. The processing device 70 includes a first convolutional layer 62a, a second convolutional layer 62b, a third convolutional layer 62c, a fourth convolutional layer 62d, a fifth convolutional layer 62e, a sixth convolutional layer 62f, a seventh convolutional layer 62g, an eighth convolutional layer 62h, a ninth convolutional layer 62i, a tenth convolutional layer 62j, an eleventh convolutional layer 62k, a twelfth convolutional layer 62l, a thirteenth convolutional layer 62m, which are generically referred to as convolutional layers 62, a first pooling layer 64a, a second pooling layer 64b, a third pooling layer 64c, a fourth pooling layer 64d, a fifth pooling layer 64e, which are generically referred to as pooling layers 64, a first up-pooling layer 66a, a second up-pooling layer 66b, a third up-pooling layer 66c, a fourth up-pooling layer 66d, and a fifth up-pooling layer 66e, which are generically referred to as up-pooling layers 66. The convolutional layers 62, the pooling layers 64, and the up-pooling layers 66 are shown as blocks to give an image of the respective processes.

An input image 60 is an image subject to an image recognition process in the processing device 70. A fully convolutional neural network does not include the fully connected layer mentioned above so that a limit to the size of the input image 60 is not provided. For this reason, the input image 60 may be the image 20 mentioned above. The input image 60 is input to the first convolutional layer 62a.

The convolutional layer 62 performs a process similar to that of the convolutional layer 42 described above, and the pooling layer 64 performs a process similar to that of the pooling layer 44 described above. The up-pooling layer 66 performs a process opposite to the process in the pooling layer 64. In other words, the size of the image is reduced in the pooling layer 64, but the size of the image is enlarged in the up-pooling layer 66. A publicly known technology may be used in the process in the up-pooling layer 66, and a description thereof is omitted.

In a fully convolutional neural network, the downsampling processing unit 72 and the upsampling processing unit 74 are arranged in the stated order. In the downsampling processing unit 72, the first convolutional layer 62a, the first pooling layer 64a, the second convolutional layer 62b, the second pooling layer 64b, the third convolutional layer 62c, the third pooling layer 64c, the fourth convolutional layer 62d, the fourth pooling layer 64d, the fifth convolutional layer 62e, the fifth pooling layer 64e, and the sixth convolutional layer 62f are arranged in the stated order. In other words, a convolutional process and a pooling process are repeatedly performed. Further, by repeating a convolutional process and a pooling process, the size of the image is progressively reduced.

In the upsampling processing unit 74, the seventh convolutional layer 62g, the eighth convolutional layer 62h, the first up-pooling layer 66a, the ninth convolutional layer 62i, the second up-pooling layer 66b, the tenth convolutional layer 62j, the third up-pooling layer 66c, the eleventh convolutional layer 62k, the fourth up-pooling layer 66d, the twelfth convolutional layer 62l, the fifth up-pooling layer 66e, and the thirteenth convolutional layer 62m are arranged in the stated order. In other words, a convolutional process and an up-pooling process are repeatedly performed. Further, by repeating a convolutional process and a pooling process, the size of the image is progressively enlarged. The thirteenth convolutional layer 62m outputs an image (hereinafter, referred to as "output image 68") of a size close to that of the input image 60.

By subjecting the input image 60 to an image recognition process in the downsampling processing unit 72 and the upsampling processing unit 74, the output image 68 is obtained. Each object included in the output image 68 is filled with a color determined by the class. In other words, the output image 68 resulting from the image recognition process is subjected to segmentation by filling objects with colors. In the case the internal crack 32 is included in the input image 60, for example, the output image 68 will include an internal crack region 34. The internal crack region 34 is a region recognized as the internal crack 32 and is filled with a color different from those of the other regions in the output image 68. In the case an etching unevenness and an adsorption pad are included in the input image 60, the output image 68 will include a region recognized as an etching unevenness (hereinafter, referred to as "etching unevenness region") and a region recognized as an adsorption pad (hereinafter, referred to as "adsorption pad region"). In that case, the internal crack region 34, the etching unevenness region, the adsorption region, and other regions are filled with different colors. The output image 68 is also called a feature map.

A learning (training) process is performed for the processing device 70 before performing an image recognition process described above. In a learning process, training data that yields the known output image 68 and an image for learning corresponding to the training data are input to the processing device 70 to learn a coefficient of the spatial filter of each convolutional layer 62. The training data is an image subjected to segmentation by filling objects with colors. Generally, the training data like this is produced by a manual operation. For this reason, the larger the number of items of training data, the larger the workload required to produce the training data. If the number of items of training data is decreased to reduce the workload, the precision of the image recognition process is reduced. In order to inhibit a reduction in the precision of the image recognition process while at the same time inhibiting an increase in the workload in this situation, it is necessary to reduce the workload required to produce one item of training data. Since a limit to the size of the input image 60 is not provided, the image for learning and the input image 60 may have different sizes.

Figure 4A:
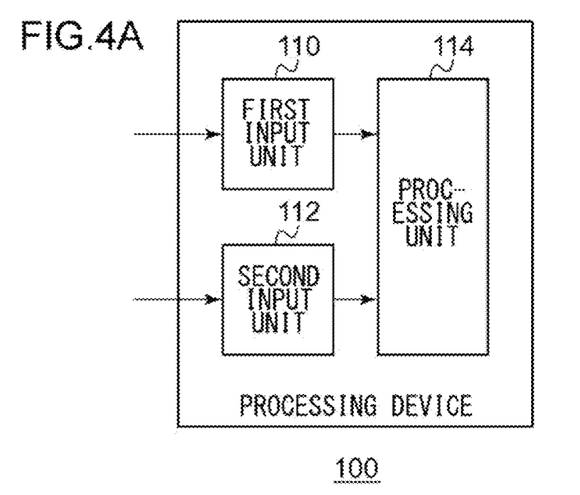
FIGS. 4A-4B show a configuration of a processing device according to the embodiment.
Figure 4B:
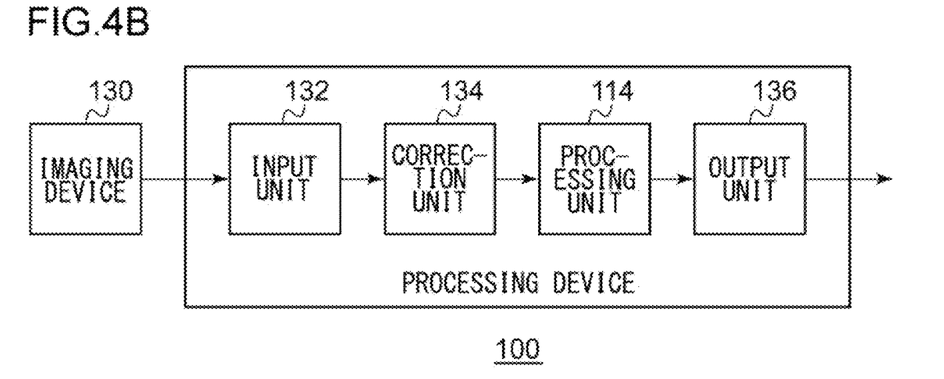

FIGS. 4A-4B show a configuration of a processing device 100. In particular, FIG. 4A shows a configuration for a learning process, and FIG. 4B shows a configuration for an image recognition process. The processing device 100 in FIG. 4A and the processing device in FIG. 4B may be the same device or different devices. The processing device 100 includes a first input unit 110, a second input unit 112, and a processing unit 114 as features for a learning process and includes an input unit 132, a correction unit 134, a processing unit 114, and an output unit 136 as features for an image recognition process. Further, the processing device 100 is connected to an imaging device 130. In other words, the processing unit 114 is trained in a learning process, and the processing unit 114 is used in an image recognition process. Before describing the configuration of the processing device 100, the configuration of the processing unit 114 will be described as in the case of FIGS. 2 and 3.

Figure 5:
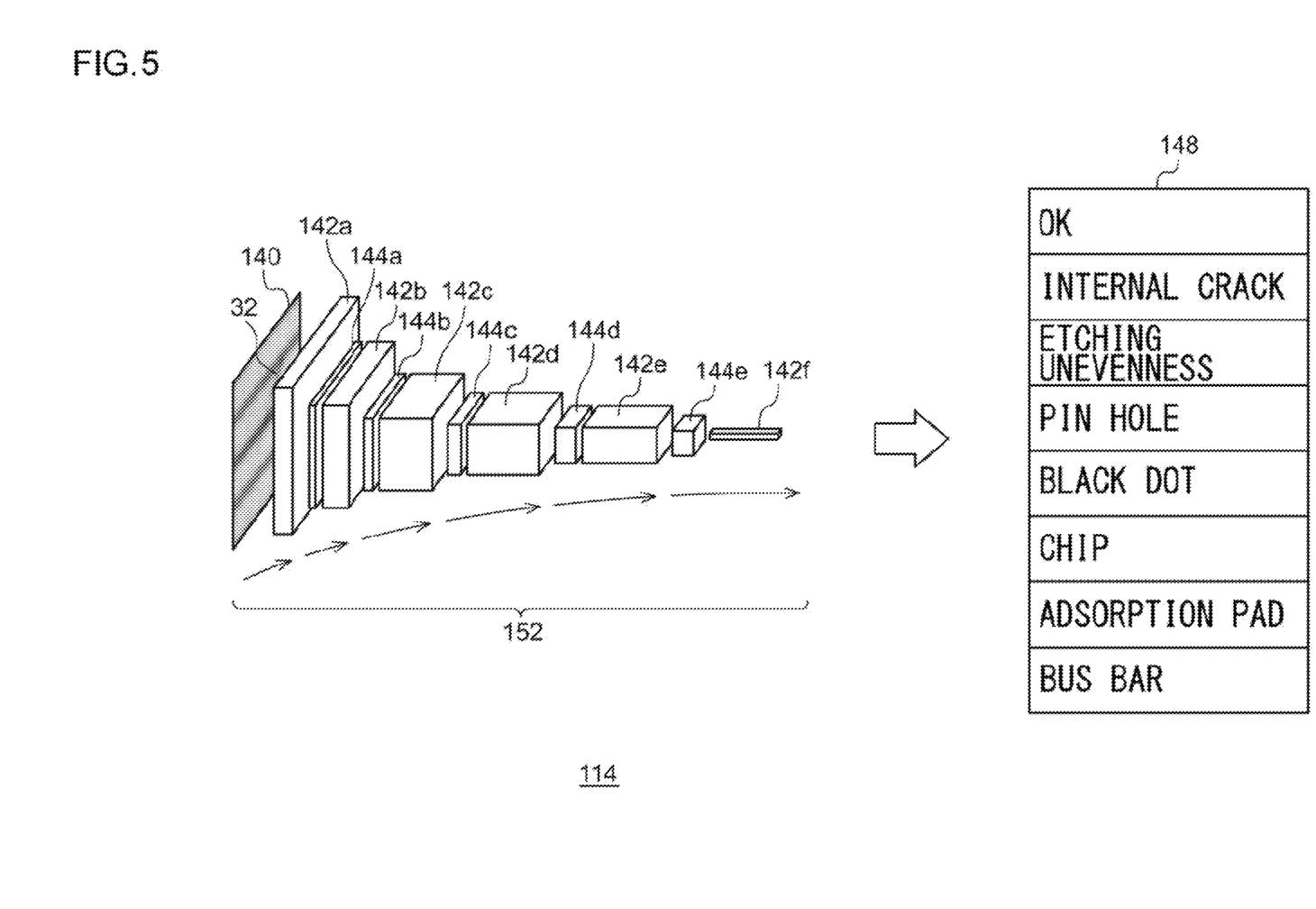
FIG. 5 shows an outline of a process in the processing unit of FIGS. 4A-4B.

FIG. 5 shows an outline of a process in the processing unit 114. The processing unit 114 includes a first convolutional layer 142a, a second convolutional layer 142b, a third convolutional layer 142c, a fourth convolutional layer 142d, a fifth convolutional layer 142e, a sixth convolutional layer 142f, which are generically referred to as convolutional layers 142, a first pooling layer 144a, a second pooling layer 144b, a third pooling layer 144c, a fourth pooling layer 144d, and a fifth pooling layer 144e, which are generically referred to as pooling layers 144. The convolutional layers 142 and the pooling layers 144 are shown as blocks to give an image of the respective processes.

An input image 140 is an image subject to an image recognition process in the processing device 100. Like a fully convolutional neural network, the neural network in the processing unit 114 does not include a fully connected layer so that a limit to the size of the input image 140 is not provided. For this reason, the input image 60 may be the image 20 mentioned above. The input image 140 is input to the first pooling layer 144a. The convolutional layer 142 performs a process similar to that of the convolutional layer 42 and the convolutional layer 62 described above, and the pooling layer 144 performs a process similar to that of the pooling layer 44 and the pooling layer 64 described above.

As in a fully convolutional neural network, a downsampling processing unit 152 is provided in the processing unit 114. Unlike the case of a fully convolutional neural network, however, an upsampling processing unit is not provided in the processing unit 114. In the downsampling processing unit 152, the first convolutional layer 142a, the first pooling layer 144a, the second convolutional layer 142b, the second pooling layer 144b, the third convolutional layer 142c, the third pooling layer 144c, the fourth convolutional layer 142d, the fourth pooling layer 144d, the fifth convolutional layer 142e, the fifth pooling layer 144e, and the sixth convolutional layer 142f are arranged in the stated order. In other words, a convolutional process and a pooling process are repeatedly performed.

Figure 6:
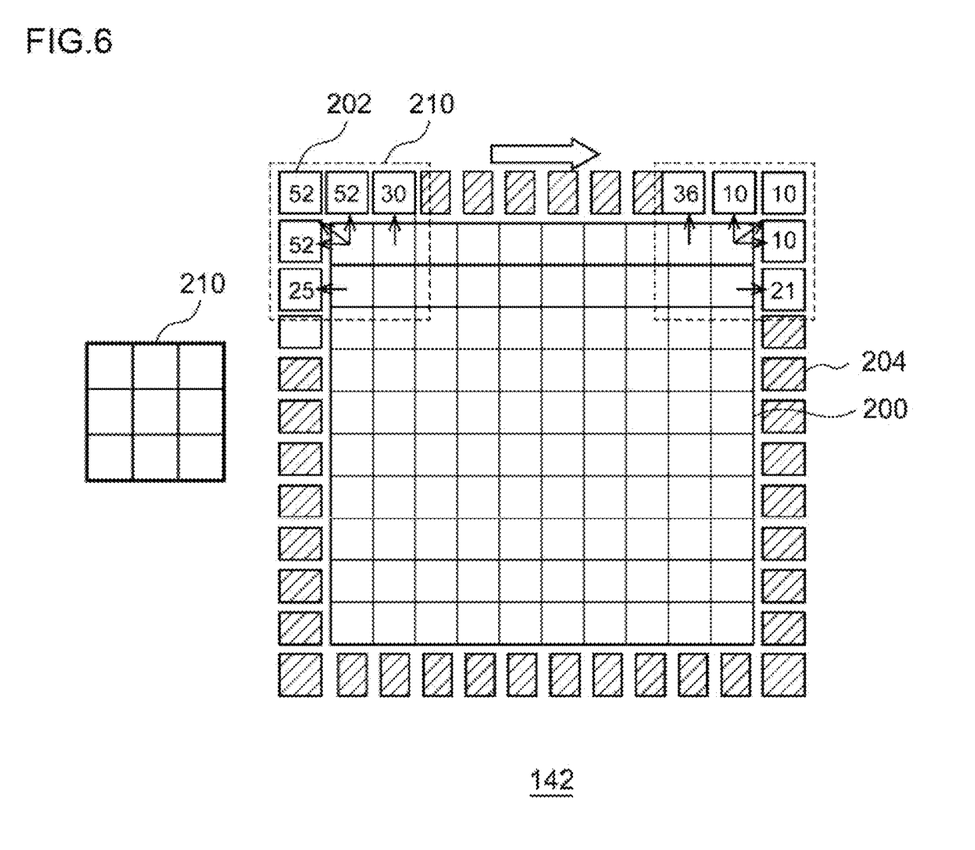
FIG. 6 shows an outline of a process in the convolutional layer in FIG. 5.

FIG. 6 shows an outline of a process in the convolutional layer 142. An image 200 is subject to a process in the convolutional layer 142 and is comprised of 10×10 pixels by way of one example. Each pixel has a pixel value. The convolutional layer 142 produces an expanded image 204 by expanding the border of the image 200 by paddings 202. Each padding 202 is also a pixel, and the expanded image 204 is comprised of 12×12 pixels. The convolutional layer 142 subjects the expanded image 204 to convolution by successively shifting a filter 210 having a size smaller than that of the expanded image 204. The filter 210 has a size of, for example, 3×3.

The pixel values of the padding 202 are determined as follows. In the case the filter 210 is applied to the expanded image 204 so as to include paddings 202, the processing unit 114 uses, in the padding 202, a pixel value in a portion of the image to which the filter 210 is applied, i.e., a pixel value of one of pixels. In the case the filter 210 is applied to a top left portion of the expanded image 204 as shown in FIG. 6, five paddings 202 and four pixels are included. In this case, one of the pixels value of the four pixels is used as the pixel value of each padding 202. For example, the pixel value of the pixel closest to the padding 202 is used as the pixel value of the padding 202. Alternatively, in the case the filter 210 is applied to the expanded image 204 so as to include paddings 202, the processing unit 114 uses, in the paddings 202, a statistical value of a portion of the image to which the filter 210 is applied, i.e., a statistical value of pixel values of pixels. In the case the filter 210 is applied to the top left portion of the expanded image 240 as shown in FIG. 6, a statistical value of the pixel values of the four pixels is used as the pixel value of each padding 202. The statistical value may be an average value or a median value. Reference is made back to FIG. 5.

By repeating a convolutional process and a pooling process, the size of the image is progressively reduced. The sixth convolutional layer 142f outputs an image (hereinafter, referred to as "output image 148") having one or more channels. The pooling layer 144 may be provided in the final stage, and the pooling layer 144 may output the output image 148. In this case, too, the number of channels is "8", by way of one example. In other words, by subjecting the input image 140 to an image recognition process in the downsampling processing unit 152, the output image 148 is obtained. The output image 148 is described later in detail.

Based on the configuration of the processing unit 114 as described above, a description will now be given of the learning process in the processing device 100 with reference to FIG. 4A. The first input unit 110 receives training data that yields the known output image 148, and the second input unit 112 receives an image for learning corresponding to the training data received in the first input unit 110. The processing unit 114 has the configuration of FIG. 5, and a coefficient of the spatial filter of each convolutional layer 142 is learned, based on the training data received in the first input unit 110 and the image for learning received in the second input unit 112.

In this embodiment, the size of the training data has a 1×1 spatial dimension. For this reason, the training data does not have positional information on an object included in the image for learning. The training data for one channel merely indicates the presence of an object of one of the 8 classes in the output 48 mentioned above. In the case the internal crack 32 is included in the image for learning, for example, the training data of the class "internal crack" indicates the presence of an internal crack. The same is true of the other classes. Therefore, the training data for 8 channels merely indicates the presence of the objects of the respective classes. In other words, the training data for one channel need only indicate whether an object of one class is present or not. The training data need not be an image subjected to segmentation by filling objects with colors. Thus, as compared with the case of producing g an image subjected to segmentation by filling objects with colors, the workload to produce one item of training data is reduced. As a result, it is possible to increase the number of items of training data while also inhibiting an increase in the workload.

Meanwhile, the image for learning is an original image that outputs the training data when the image recognition process is performed accurately, and its size is defined to result in training data having a 1×1 spatial dimension. Since a limit to the size of the input image 140 is not provided, the image for learning and the input image 140 may have different sizes. For learning of a coefficient of the spatial filter under a situation like this where training data and an image for learning are used, a publicly known technology may be used so that a description thereof is omitted.

A description will now be given of an image recognition process in the processing device 100 with reference to FIG. 4B. In the case the processing devices 100 in FIG. 4A and in FIG. 4B are different devices, the coefficient of the spatial filter derived by learning in the processing unit 114 in FIG. 4A is set in the processing unit 114 in FIG. 4B.

Figure 7A:
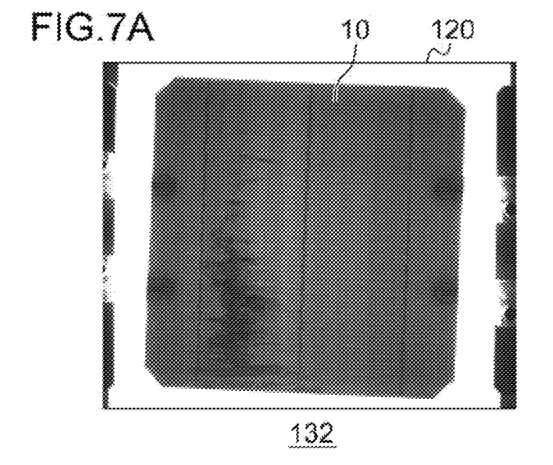
FIGS. 7A-7C show an image processed in the processing device of FIG. 4B.

For example, the imaging device 130 is an infrared camera and images the solar cell 100 of FIG. 1A subject to inspection, i.e., subject to an image recognition process, with infrared light. For example, an image is captured in 8 bits and 9M pixels. The imaging device 130 outputs the captured image to the processing device 100. The input unit 132 of the processing device 100 receive the image (hereinafter, referred to as "image 120") captured by the imaging device 130. FIGS. 7A-7C show an image 120 processed in the processing device 100. In particular, FIG. 7A shows an image 120 input to the input unit 132. The image 120 shows the light receiving surface 12 or the back surface 14 of the solar cell 10. Generally, the solar cell 10 is shown tilted in the image 120. FIGS. 7A-7B will be described later, and reference is made back to FIG. 4B. The input unit 132 outputs the image 120 to the correction unit 134.

Figure 7B:
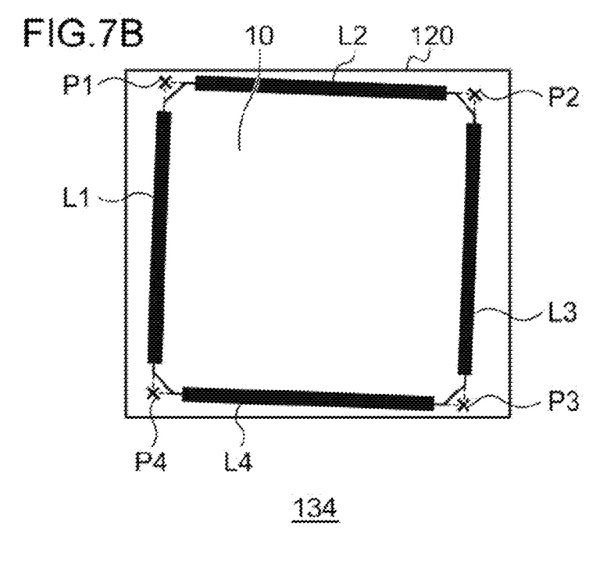
Figure 7C:
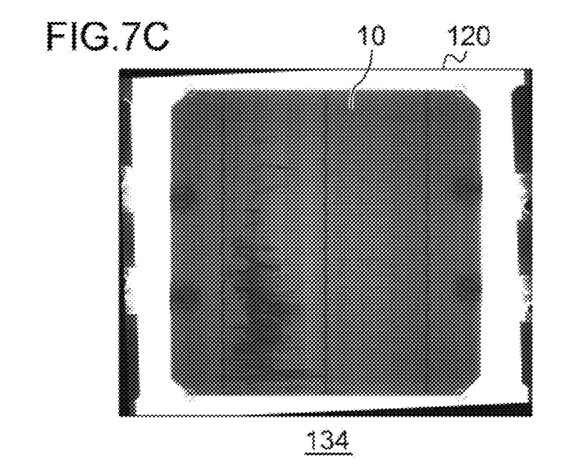

The correction unit 134 receives the image 120 from the input unit 132. The correction unit 134 corrects the tilt of the solar cell 10 in the image 120. As shown in FIG. 7B, the correction unit 134 identifies a first side L1, a second side L2, a third side L3, and a fourth side L4 of the solar cell 10 in the image 120 of FIG. 7A. The correction unit 134 also derives a first point of intersection P1 between the extensions of the first side L1 and the second side L2. The correction unit 134 also derives a second point of intersection P2, a third point of intersection P3, and a fourth point of intersection P4 as in the case of the first point of intersection P1. Subsequently, the correction unit 134 uses perspective projection transform to deform the image 120 so as to move the first point of intersection P1, the second point of intersection P2, the third point of intersection P3, and the fourth point of intersection P4 to the defined coordinates. FIG. 7C shows the result of deformation. The correction unit 134 outputs the corrected image 120 to the processing unit 114.

The processing unit 114 receives the corrected image 120 from the correction unit 134. The processing unit 114 has a configuration as shown in FIG. 5, and the received image 120 corresponds to the input image 140. Therefore, the corrected image 120 will be referred to as the input image 140 below. As mentioned above, the processing unit 114 subjects the input image 140 to a process of a convolution neural network in which the fully connected layer 46 is excluded. The convolutional neural network in the processing unit 114 includes the downsampling processing unit 152, and the downsampling processing unit 152 includes a plurality of convolutional layers 142 and a plurality of pooling layers 144. Therefore, the processing unit 114 performs a downsampling process but does not perform an upsampling process.

Further, in the convolutional neural network in the processing unit 114, the spatial filter of the convolutional layer 42 is trained to learn the processing result having a 1×1 spatial dimension and having 8 channels, i.e., the training data, In particular, the spatial filter of the convolutional layer 42 is trained to learn whether the objects of the 8 classes corresponding one to one to the 8 channels are present or absent. One of the objects of the 8 classes is the internal crack 32.

The output image 148 resulting from the process or the inspection is obtained through the image recognition process by the processing unit 114 that has been trained. The output image 148 shows the presence or absence of the objects of the 8 classes. Meanwhile, the size of the output image 148 is smaller than the size of the input image 140. Therefore, the output image 148 lacks, for example, accurate positional information on the internal crack 32. However, inspection by the processing device 100 only requires detecting whether the internal crack 32 is present or absent so that accurate positional information on the internal crack 32 is not necessary. For this reason, lack of accurate positional information on the internal crack 32 does not result in a reduction in the precision of the image recognition process. In the case the image for learning and the input image 140 have different sizes, the output image 148 has a spatial dimension larger than 1×1, unlike the training data. The processing unit 114 outputs the output image 148 to the output unit 136, and the output unit 136 outputs the output image 148 outside.

As mentioned above, the image for learning and the input image 140 may have different sizes. In particular, the size of the input image 140 may be larger than the size of the image for learning. The image for learning is input to the fully convolutional neural network to train the filter 210 of the convolutional layer and corresponds to the training data. When the input image 140 like this is input to the processing device 100, the output image 148 output from the output unit 136 will have a spatial dimension smaller than the size of the input image 140 and larger than 1×1.

Figure 8A:
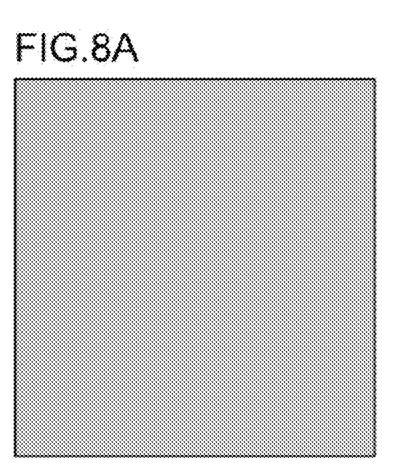
FIGS. 8A-8B show the output image output from the output unit of FIG. 4B.
Figure 8B:
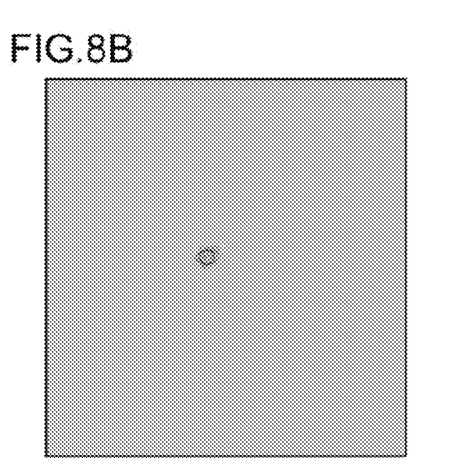

FIGS. 8A-8B show the output image 148 output from the output unit 136. FIG. 8A shows that the output image 148 is substantially entirely colored with the same color. This makes it clear that the internal crack 32 is not found in the solar cell 10. Meanwhile, FIG. 8B shows that the image is filled with colors in accordance with the class. The central portion of the output image 148 is colored with a darker color than the other portions. This makes it clear that the internal crack 32 is found in the central portion of the solar cell 10. In other words, the output image 148 has a spatial dimension larger than 1×1 so that the relative position of the internal crack 32 in the solar cell 10 as well as whether it is present or absent is identified by the feature map. The feature map is also called a heat map.

The device, the system, or the entity that executes the method according to the disclosure is provided with a computer. By causing the computer to run a program, the function of the device, the system, or the entity that executes the method according to the disclosure is realized. The computer is comprised of a processor that operates in accordance with the program as a main hardware feature. The disclosure is non-limiting as to the type of the processor so long as the function is realized by running the program. The processor is comprised of one or a plurality of electronic circuits including a semiconductor integrated circuit (IC) or a large-scale integration (LSI). The plurality of electronic circuits may be integrated in one chip or provided in a plurality of chips. The plurality of chips may be aggregated in one device or provided in a plurality of devices. The program is recorded in a non-transitory recording medium such as a computer-readable ROM, optical disk, and hard disk drive. The program may be stored in a recording medium in advance or supplied to a recording medium via wide area communication network including the Internet.

Figure 9A:
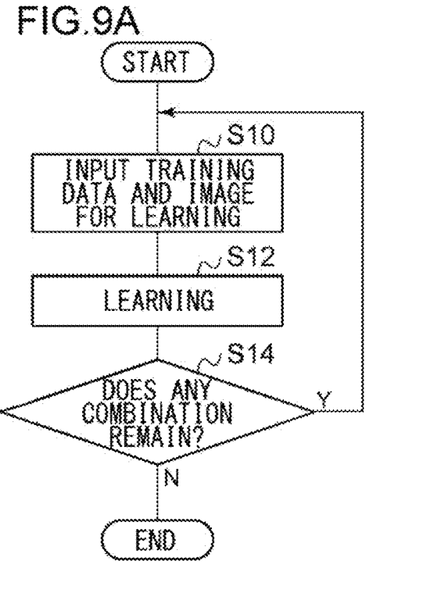
FIGS. 9A-9B show a flowchart showing a sequence of steps performed in the processing device of FIGS. 4A-4B.
Figure 9B:
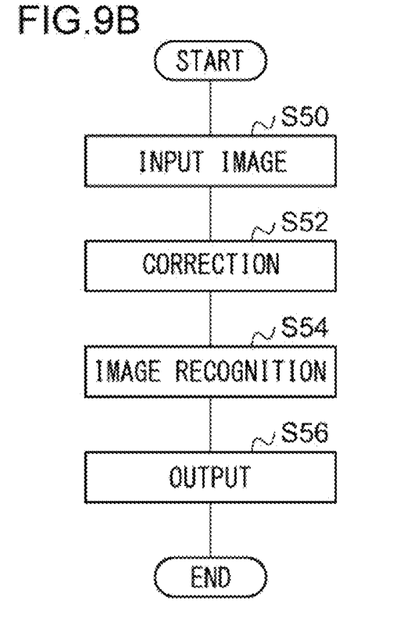

A description will now be given of the operation of the processing device 100 having the configuration described above. FIGS. 9A-9B show a flowchart showing a sequence of steps performed in the processing device 100. FIG. 9A is a flowchart showing a sequence of steps in a learning process. The first input unit 110 receives an input of training data, and the second input unit 112 receives an input of image for learning (S10). The processing unit 114 uses the training data and the image for learning to learn a coefficient of the spatial filter of each convolutional layer 42 (S12). When any combination of training data and image for learning remains unprocessed (Y in S14), control is returned to step 10. When no combinations of training data and image for learning remain (N in S14), the process is terminated.

FIG. 9B is a flowchart showing a sequence of steps in an image recognition process. The input unit 132 receives an input of the image 120 (S50). The correction unit 134 corrects the tilt of the image 120 (S52). The processing unit 114 performs an image recognition process by using the corrected image 120 as the input image 140 (S54). The output unit 136 outputs the output image 148 resulting from the image recognition process (S56).

According to this embodiment, a convolutional neural network in which the spatial filter of the convolutional layer 142 has learned training data having a 1×1 spatial dimension is used. Therefore, the workload required to produce training data is reduced. Further, since the workload required to produce training data is reduced, the workload required for learning is inhibited from increasing. Further, since the workload required to produce training data is reduced, the number of items of training data can be increased. Further, by increasing the number of items of training data, the precision of learning can be improved.

Further, since a convolutional neural network in which the spatial filter of the convolutional layer 142 has learned training data having a 1×1 spatial dimension is used, it is possible to detect whether a target object is present or absent. Further, since whether a target object is present or absent is detected, the precision of the image recognition process is inhibited from being lowered. Further, since a convolutional neural network in which the spatial filter of the convolutional layer 142 has learned training data having a 1×1 spatial dimension is used, it is possible to inhibit a reduction in the precision of the image recognition process while at the same time inhibiting an increase in the workload required for learning.

Further, since the convolutional neural network performs a downsampling process by using the convolutional layers 142 and the pooling layers 144 and does not perform an upsampling process, training data having a 1×1 spatial dimension can be used for learning. Further, since an image capturing the solar cell 10 is input in a situation in which the spatial filter of the convolutional layer 142 has learned at least the presence or absence of the internal crack 32, an inspection can be made to determine whether the internal crack 32 is present or absent.

Further, by inputting the input image 140 of a size larger than the size of the image for learning, the output image 148 having a spatial dimension equal to or larger than 1×1 can be obtained. Further, since the output image 148 having a spatial dimension equal to or larger than 1×1 can be obtained, relative positional information can be obtained. Further, by using a pixel value of a pixel included in the image as a pixel value of the padding 202, deterioration in detection precision due to the padding 202 is inhibited. Further, by using a statistical value of pixel values of pixels included in the image as a pixel of the padding 202, deterioration in detection precision due to the padding 202 is inhibited.

A summary of an embodiment of the present disclosure is given below. A processing device (100) according to an embodiment of the present disclosure includes: an input unit (132) that receives an input of an image subject to a process; a processing unit (114) that subjects the image input to the input unit (132) to a process of a convolutional neural network in which a fully connected layer is excluded; and an output unit (136) that outputs a result of the process in the processing unit (114). The convolutional neural network in the processing unit (114) includes a convolutional layer (142) and a pooling layer (144). A filter (210) of the convolutional layer (142) in the convolutional neural network in the processing unit (114) is trained to learn the result of the process having a 1×1 spatial dimension. A size of the image input to the input unit (132) is larger than a size of an image for learning input to the convolutional neural network when the filter (210) of the convolutional layer (142) is trained for learning, the image for learning corresponding to the result of the process used to train the filter (210) of the convolutional layer (142) for learning.

The convolutional neural network in the processing unit (114) may perform a downsampling process in the convolutional layer (142) and the pooling layer (144) and does not perform an upsampling process.

The result of the process output from the output unit (136) may have a spatial dimension smaller than the size of the image input to the input unit (132) and larger than 1×1 and represents a feature map.

The convolutional layer (142) included in the convolutional neural network in the processing unit may expand a border of the image by a padding (202) and subject an expanded image to convolution by successively shifting a filter (210) having a size smaller than a size of the expanded image, and, in the case the filter (210) is applied to include the padding (202), the processing unit (114) may use, in the padding (202), one of values in a portion of the image to which the filter (210) is applied.

The convolutional layer (142) included in the convolutional neural network in the processing unit (114) may expand a border of the image by a padding (202) and subject an expanded image to convolution by successively shifting a filter (210) having a size smaller than a size of the expanded image, and, in the case the filter (210) is applied to include the padding (202), the processing unit (114) uses, in the padding, a statistical value of values in a portion of the image to which the filter (210) is applied.

The image input to the input unit (132) may be an image that captures an object subject to inspection, the filter (210) of the convolutional layer (142) in the convolutional neural network in the processing unit (114) learns at least whether a defect is present or absent, and the output unit (136) may output the result of the process in the processing unit (114) as an inspection result.

The image input to the input unit may be an image that captures an object subject to inspection, the spatial filter (210) of the convolutional layer (142) in the convolutional neural network in the processing unit (114) may learn at least one or more elements that could be included in an object, and the output unit (136) may output the result of the process in the processing unit (114) as an inspection result.

Another embodiment of the present disclosure relates to a processing method. The method includes: receiving an input of an image subject to a process; subjecting the input image to a process of a convolutional neural network in which a fully connected layer is excluded; and outputting a result of the process. The convolutional neural network includes a convolutional layer (142) and a pooling layer (144). A filter of the convolutional layer (142) in the convolutional neural network is trained to learn the result of the process having a 1×1 spatial dimension. A size of the input image is larger than a size of an image for learning input to the convolutional neural network when the filter (210) of the convolutional layer (142) is trained for learning, the image for learning corresponding to the result of the process used to train the filter (210) of the convolutional layer (142) for learning.

Given above is a description of the present disclosure based on an exemplary embodiment. The embodiment is intended to be illustrative only and it will be understood by those skilled in the art that various modifications to constituting elements and processes could be developed and that such modifications are also within the scope of the present disclosure.

The configuration of the processing unit 114 according to the embodiment is such that the plurality of convolutional layers 42 and the plurality of pooling layers 44 are alternately arranged. Alternatively, the processing unit 114 may have a configuration of a GoogleNet-based network, a DenseNet-based network, etc. According to this variation, the flexibility in configuration can be improved.

The processing device 100 according to the embodiment performs a process for detecting whether the internal crack 32 is present or absent by referring to the input image 140 of the solar cell 10. Alternatively, the input image 140 that captures an image of an object other than the solar cell 10 may be subject to the process. Further, a process for detecting whether a defect other than the internal crack 32 is present or absent may be performed. Still further, a process for detecting one or more elements that could be included in an object may be performed instead of a process for detecting whether a defect in the object is present or absent. According to this variation, the scope of application of the processing device 100 can be broadened.

REFERENCE SIGNS LIST 10 solar cell, 32 internal crack, 100 processing device, 110 first input unit, 112 second input unit, 114 processing unit, 120 image, 130 imaging device, 132 input unit, 134 correction unit, 136 output unit, 140 input image, 142 convolutional layer, 144 pooling layer, 148 output image, 152 downsampling processing unit

INDUSTRIAL APPLICABILITY

According to the present disclosure, it is possible to inhibit a reduction in the precision of an image recognition process while at the same time inhibiting an increase in the workload required for learning.

The invention claimed is:
1. A processing device comprising,
an input unit that receives an input of an image subject to a process;

a processing unit that subjects the Image Input to the input unit to a process of a convolutional neural network in which a fully connected layer is excluded; and an output unit that outputs a result of the process in the processing unit, wherein the convolutional neural network in the processing unit, includes a convolutional layer and a pooling layer;

wherein a filter of the convolutional layer in the convolutional neural network in the processing unit is trained to learn the result of the process having a 1×1 spatial dimension, wherein a size of the image input to the input unit is larger than a size of an image for learning input to the convolutional neural network when the filter of the convolutional layer is trained for learning, the image for learning corresponding to the result of the process used to train the filter of the convolutional layer Air learning, wherein the convolutional neural network in the processing unit performs a downsampling process in the convolutional layer and the pooling layer and does not perform an upsampling process, and wherein the result of the process output from the output unit has a spatial dimension smaller than the size of the image input to the input unit and larger than 1×1 and represents a feature map.

2. A processing device comprising;
an input unit that receives an input of an image subject to a process;
a processing unit that subjects the image input to the input unit to a process of a convolutional neural network to which a fully connected layer is excluded; and
an output unit that outputs a result of the process in the processing unit,
wherein the convolutional neural network in the processing unit includes a convolutional layer and a pooling layer,
wherein a filter of the convolutional layer in the convolutional neural network in the processing unit is trained to learn the result of the process having a 1×1 spatial dimension,
wherein a size of the image input to the input unit is larger than a size of an image for learning input to the convolutional neural network when the filter of the convolutional layer is trained for learning, the image for learning corresponding to the result of the process used to train the taller of the convolutional layer for learning,
wherein the convolutional layer included in the convolutional neural network in the processing unit expands a border of the image by a padding and subjects an expanded image to convolution by successively shifting a filter having a size smaller than a size of the expanded image, and
wherein in the case the filter is applied to include the padding, the processing unit uses, in the padding, one of values in a portion of the image to which the filter is applied.

3. A processing device comprising:
an input unit that receives an input of an image subject to a process;
a processing unit that subjects the image input to the input unit to a process of a convolutional neural network in which a fully connected layer is excluded; and
an output unit that outputs a result of the process in the processing unit,
wherein the convolutional neural network in the processing unit Includes a convolutional layer and a pooling layer,
wherein a filter of the convolutional layer in the convolutional neural network in the processing unit is trained to learn the result of the process having a 1×1 spatial dimension,
wherein a size of the image input to the input unit is larger than a size of an image for learning input to the convolutional neural network when the filter of the convolutional layer is trained for learning, the image for learning corresponding to the result of the process used to train the filter of the convolutional layer for learning,
wherein the convolutional layer included in the convolutional neural network in the processing unit expands a border of the image by a padding and subjects an expanded image to convolution by successively shifting a filter having a size smaller than a size of the expanded image, and
wherein in the case the filter is applied to include the padding, the processing unit uses, in the padding, a statistical value of values in a portion of the image to which the filter is applied.

4. A processing method comprising:
receiving an input of an image subject to a process;
subjecting the input image to a process of a convolutional neural network in which a folly connected layer is excluded; and
outputting a result of the process,
wherein the convolutional neural network includes a convolutional layer and a pooling layer,
wherein a filter of the convolutional layer in the convolutional neural network is trained to learn the result of the process having a 1×1 spatial dimension,
wherein a size of the input image is larger than a size of an image for learning input to the convolutional neural network when the filter of the convolutional layer is trained for learning, the image for learning corresponding to the result of the process used to train the filter of the convolutional layer for learning,
wherein the convolutional neural network performs a downsampling process in the convolutional layer and the pooling layer and does not perform an upsampling process, and
wherein the result of the output process output has a spacial dimension smaller than the size of the Input image and, lamer than 1×1 and represents a feature map.

5. A processing method comprising:
receiving an input of an image subject to a process;
subjecting the input image to a process of a convolutional neural network in which a fully connected layer is excluded; and
outputting a result of the process,
wherein the convolutional neural network includes a convolutional layer and a pooling layer,
wherein a filter of the convolutional layer in the convolutional neural network is trained to learn the result of the process having a 1×1 spatial dimension,
wherein a size of the input image is larger than a size of an image for learning input to the convolutional neural network when the filter of the convolutional layer is trained for learning, the image for learning corresponding to the result of the process used to train the filter of the convolutional layer for learning, wherein the convolutional layer included in the convolutional neural network expands a border of the Image by a padding and subjects an expanded image to convolution by successively shifting a filter having a size smaller than a size of the expanded image, and wherein in the case the filter is applied to include the padding, one of values in a portion of the image to which the filter is applied is used in the padding.

6. A processing method comprising:

receiving an input of an image subject to a process;

subjecting the input image to a process of a convolutional neural network in which a fully connected layer is excluded; and outputting a result of the process, wherein the convolutional neural network includes a convolutional layer and a pooling layer, wherein a filter of the convolutional layer in the convolutional neural network is trained to learn the result of the process having a 1×1 spatial dimension, wherein a size of the input image is larger than a size of an image for learning input to the convolutional neural network when the filter of the convolutional layer is trained for learning, the image for learning corresponding to the result of the process used to train the filter of the convolutional layer for learning, wherein the convolutional layer included in the convolutional neural network expands a border of the image by a padding and subjects an expanded image to convolution by successively shilling a filter having a size smaller than a size of the expanded image, and wherein in the case the filter is applied to include the padding, a statistical value of values in a portion of the image to which the filter is applied is used in the padding.

* * * * *